US012761169B2

(12) United States Patent
Yu et al.

(10) Patent No.: US 12,761,169 B2
(45) Date of Patent: Oct. 13, 2026

(54) REAL-TIME IN SITU MONITORING OF DRUG PRODUCT DEGRADATION USING WATER PROTON NMR

(71) Applicant: UNIVERSITY OF MARYLAND, BALTIMORE, Baltimore, MD (US)

(72) Inventors: Yihua (Bruce) Yu, Baltimore, MD (US); Marc B. Taraban, Baltimore, MD (US); Katharine T. Briggs, Baltimore, MD (US)

(73) Assignee: University of Maryland, Baltimore, Baltimore, MD (US)

( * ) Notice: Subject to any disclaimer, the term of this patent is extended or adjusted under 35 U.S.C. 154(b) by 1103 days.

(21) Appl. No.: 17/206,373

(22) Filed: Mar. 19, 2021

(65) Prior Publication Data

US 2021/0325324 A1 Oct. 21, 2021

Related U.S. Application Data

(60) Provisional application No. 63/010,127, filed on Apr. 15, 2020.

(51) Int. Cl.
*G01N 24/08* (2006.01)

(52) U.S. Cl.
CPC .................................. *G01N 24/088* (2013.01)

(58) Field of Classification Search
CPC ... G01N 24/088; G01R 33/448; G01R 33/307
See application file for complete search history.

(56) References Cited

U.S. PATENT DOCUMENTS

| | | | | |
|---|---|---|---|---|
| 6,307,372 | B1 * | 10/2001 | Sugarman | G01R 33/44 422/67 |
| 8,314,618 | B2 | 11/2012 | Bieri et al. | |
| 8,854,038 | B2 | 10/2014 | Hernando | |
| 8,862,407 | B2 | 10/2014 | Chugunov et al. | |
| 9,194,925 | B2 | 11/2015 | Zhong et al. | |
| 10,267,754 | B2 * | 4/2019 | Yu | G01N 33/15 |
| 10,514,347 | B2 * | 12/2019 | Yu | G01N 33/15 |
| 10,724,974 | B2 * | 7/2020 | Yu | G01R 33/448 |
| 11,119,061 | B2 * | 9/2021 | Yu | G01R 33/50 |
| 12,203,882 | B2 * | 1/2025 | Yu | G01N 24/08 |
| 2004/0090231 | A1 | 5/2004 | Augustine et al. | |
| 2005/0287527 | A1 | 12/2005 | Ni et al. | |
| 2006/0269965 | A1 | 11/2006 | Josephson | |
| 2007/0116602 | A1 | 5/2007 | Lee | |
| 2007/0152666 | A1 | 7/2007 | Thesen | |

(Continued)

OTHER PUBLICATIONS

Dalitz, Franz, et al. "Process and reaction monitoring by low-field NMR spectroscopy." Progress in nuclear magnetic resonance spectroscopy 60 (2012): 52-70. (Year: 2012).*

(Continued)

*Primary Examiner* — Brian R Gordon
(74) *Attorney, Agent, or Firm* — Casimir Jones, S.C.; Tristan A. Fuierer

(57) ABSTRACT

A method of using the relaxation rate ($R_1$ and/or $R_2$) of solvent NMR signal to assess whether drug products have undergone substantial chemical degradation during manufacturing, transport and/or storage. The monitoring can be performed under both static and flow conditions, in real-time and in a contact-free manner.

5 Claims, 3 Drawing Sheets

(56) References Cited

U.S. PATENT DOCUMENTS

| | | | | |
|---|---|---|---|---|
| 2009/0121712 | A1* | 5/2009 | Han | G01R 33/56366 324/307 |
| 2010/0047180 | A1 | 2/2010 | Zeng et al. | |
| 2010/0072994 | A1 | 3/2010 | Lee et al. | |
| 2010/0278829 | A1 | 11/2010 | Edwards, III et al. | |
| 2011/0124744 | A1 | 5/2011 | Lee et al. | |
| 2012/0100546 | A1 | 4/2012 | Lowery, Jr. et al. | |
| 2012/0164644 | A1 | 6/2012 | Neely et al. | |
| 2013/0244238 | A1 | 9/2013 | Neely et al. | |
| 2013/0265054 | A1 | 10/2013 | Lowery, Jr | |
| 2015/0147746 | A1* | 5/2015 | Rapoport | G01R 33/1276 435/5 |
| 2016/0047761 | A1* | 2/2016 | Yu | G01R 33/50 324/309 |
| 2017/0176359 | A1 | 6/2017 | Graessl et al. | |
| 2018/0052122 | A1 | 2/2018 | Davis et al. | |
| 2018/0113141 | A1 | 4/2018 | Lowery, Jr. | |
| 2019/0293579 | A1 | 9/2019 | Yu et al. | |
| 2019/0391218 | A1 | 12/2019 | Yu et al. | |
| 2021/0010961 | A1* | 1/2021 | Yu | G01R 33/448 |
| 2022/0163468 | A1* | 5/2022 | Yu | G01N 24/08 |

OTHER PUBLICATIONS

Singh, Ranjit, and Zia Ur Rehman. "Current trends in forced degradation study for pharmaceutical product development." Journal of Pharmaceutical Education and Research 3.1 (2012): 54. (Year: 2012).*

Foley, David A., et al. "Online NMR and HPLC as a reaction monitoring platform for pharmaceutical process development." Analytical chemistry 85.19 (2013): 8928-8932. (Year: 2013).*

Briggs, Katharine T., et al. "Nondestructive quantitative inspection of drug products using benchtop NMR relaxometry-the case of NovoMix® 30." AAPS PharmSciTech 20 (2019): 1-9. (Year: 2019).*

Yu, Y. B., Y. Feng, and M. B. Taraban. "Water proton NMR for noninvasive chemical analysis and drug product inspection." Am Pharm Rev 20.1 (2017): 34-39. (Year: 2017).*

Brusotti, Gloria, et al. "Advances on size exclusion chromatography and applications on the analysis of protein biopharmaceuticals and protein aggregates: a mini review." Chromatographia 81.1 (2018): 3-23. (Year: 2018).*

Nov. 23, 2021 Office Action in U.S. Appl. No. 16/593,145.

Briggs, K.T., Taraban, M.B., Yu, Y.B. (2018) Water proton NMR detection of amide hydrolysis and diglycine dimerization. Chem. Comm. 54, 7003-7006.

Metz, H., Mäder, K., (2008) Benchtop-NMR and MRI—a new analytical tool in drug delivery research, Int. J. Pharm., 364, 170-175.

Rohrer, M, Bauer, H., Mintorovitch, Jan., Requardt, M., Weinmann, H.J., (2005) Comparison of magnetic properties of MRI contrast media solutions at different magnetic field strengths. Invest. Radiol. 40, 715-724.

Yu, Y.B., Feng, Y., Taraban, M.B. (2017) Water proton NMR for noninvasive chemical analysis and drug product inspection. Am. Pharmaceut. Rev. 20, 34-39.

Taraban, M.B., Truong, H.C., Feng, Y., Jouravleva, E.V., Anisimov, M.A., Yu, Y.B., (2015) Water Proton NMR for In Situ Detection of Insulin Aggregates, J. Pharm. Sci., 104, 4132-4141.

Taraban, M.B., DePaz, R.A., Lobo, B., Yu, Y.B. (2017a) Water proton NMR: a tool for protein aggregation characterization. Anal. Chem. 89, 5494-5502.

Taraban, M.B., Truong, H., Ilavsky, J., DePaz, R.A., Lobo, B., Yu, Y.B. (2017b) Non-invasive detection of nanoparticle clustering by water proton NMR. Transl. Mater. Res. 4, 025002.

Taraban, M.B., Briggs, K.T., Merkel, P., Yu, Y.B., (2019) Anal. Chem. 91, 13538-13546.

Taraban, M et al.; "Water Flow-NMR—A Prospective Contact-Free In-Line Analytical Tool for Continuous Biomanufacturing," Mar. 3, 2019, PANIC 2019 conference (Practical Applications of NMR in Industry Conference), Poster.

Bouchoux, Antoine et al. "Molecular Mobility in Dense Protein Systems: An Investigation through 1 H NFM Relaxometry and Diffusometry," Journal of Physical Chemistry Part B: Condensed Matter, Materials, Surfaces, Interfaces & Biophysical, 2012 (116) (38), 11744-11753.

Daskiewicz, O. et al. "Proton Magnetic Relaxation and Protein Hydration." Nature, 1963 (200) (4910), 1006-1007.

Baroni, et al.; "Relaxometric Characterization of Balsamic Vinegar," meeting abstract 6th Conference on Field Cycling NMR Relaxometry Turin (Italy) Jun. 4, 2009.

Bloembergen, N. et al.; "Relaxation Effects in Nuclear Magnetic Resonance absorption," Phys. Rev. 1948, 73, 679-712.

Dalvit, C. et al.; "High-Throughput NMR-Based Screening with Competition Binding Experiments," J. Am. Chem. Soc., 2002, vol. 124, pp. 7702-7709.

Fanali, G. et al.; "Human serum albumin: From bench to bedside," Mol. Asp. med., 2012, vol. 33, pp. 209-290.

Korzhnev, D. et al.; "Probing Invisible, Low-Populated States of Protein Molecules by Relaxation Dispersion NMR Spectroscopy: An Application to protein Folding." Acc. Chem. Res., 2008, vol. 41, pp. 442-451.

Mao, X et al.; "Understanding Radiation Damping in a Simple Way," Concepts Magn. Reson. 1997, 9, 173.

Feng, Y., Taraban, M.B., Yu, Y.B. (2011) Linear dependency of NMR relaxation rates on shear modulus in hydrogels. Soft Matter, 7, 9890-9893.

Feng, Y., Taraban, M.B., Yu, Y.B., (2015) Water Proton NMR—A Sensitive Probe for Solute Association, Chem. Commun., 51, 6804-6807.

Weerasekare, G.M., Taraban, M.B., Shi, X., Jeong, E.-K., Trewhella, J., Yu, Y.B. (2011) Sol and gel states in peptide hydrogels visualized by Gd(III)-enhanced MRI. Biopolymers (Pept. Sci.) 96, 734-743.

Taraban, Marc B., et al.; "Accessing Aluminum Vaccine Adjuvant Filling, Sedimentation, and Resuspension in Sealed Vials using Water Proton NMR," American Pharmaceutical Review, 2019, pp. 70-73.

Briggs et al., Water proton NMR detection of amide hydrolysis and diglycine dimerization, Chem. Commun., 2018, 54, pp. 7003-7006.

* cited by examiner

REAL-TIME IN SITU MONITORING OF DRUG PRODUCT DEGRADATION USING WATER PROTON NMR

CROSS REFERENCE TO RELATED APPLICATIONS

This application is filed under the provisions of 35 U.S.C. § 111(a) and claims priority to U.S. Provisional Patent Application No. 63/010,127 filed on Apr. 15, 2020 in the name of Yihua (Bruce) Y U, et al., and entitled "Real-Time In Situ Monitoring of Drug Product Degradation Using Water Proton NMR," which is hereby incorporated by reference herein in its entirety.

STATEMENT OF FEDERAL SUPPORT

This invention was made with government support under Grant No. 75F40119C10104 awarded by the Food and Drug Administration. The government has certain rights in the invention.

FIELD

The present invention relates to methods for quality control and quality assurance of drug products using solvent nuclear magnetic resonance (NMR). The methods can be used to determine whether individual drug products have experienced substantial chemical degradation and should be removed from the distribution stream.

DESCRIPTION OF THE RELATED ART

Drug products (DP) undergo chemical degradation after product release, where the active pharmaceutical ingredient (API) and/or excipients are chemically modified. Such chemical degradation affects drug safety and efficacy. The time course and extent of degradation depends on the storage and handling details, and thereby may vary from vial to vial.

The ability to monitor DP degradation in real-time in the primary container (in situ) will facilitate DP quality control for manufacturers, distributors, and end-users. This is especially true if the measurement can be carried out using simple instruments without any reagents and does not involve any sample preparation.

There is a need for a fast and reliable technique which can be used for quality control in DP storage and transport to determine if the DP in the manufacturing and/or distribution chain has undergone chemical degradation. Towards that end, the present invention relates to a method of using the relaxation rate of a solvent NMR signal to determine whether the contents of a filled and sealed drug product container have chemically degraded. Advantageously, the method described herein is easy to use, can be noninvasive, provides results in real-time, and is highly sensitive.

SUMMARY

The present invention generally relates to a method of using NMR relaxation rates, specifically the transverse relaxation rate constant $R_2$ of a solvent such as water to determine if a drug product has experienced chemical degradation during manufacturing, transportation, and/or storage.

In one aspect, a method of determining if an aqueous-based drug product has experienced substantial chemical degradation is described, said method comprising: measuring the transverse relaxation rate of solvent $R_{2,m}$ in the drug product; and determining if the drug product has undergone substantial chemical degradation by comparing the measured $R_{2,m}$ to a reference transverse relaxation rate of solvent $R_{2,r}$, wherein the reference $R_{2,r}$ represents an acceptable range for substantially non-degraded drug product, wherein when the measured $R_{2,m}$ is inside the reference $R_{2,r}$ range, the drug product has not experienced substantial chemical degradation.

Other aspects, features and advantages of the invention will be more fully apparent from the ensuing disclosure and appended claims.

DETAILED DESCRIPTION, AND PREFERRED EMBODIMENTS THEREOF

Figure 1:
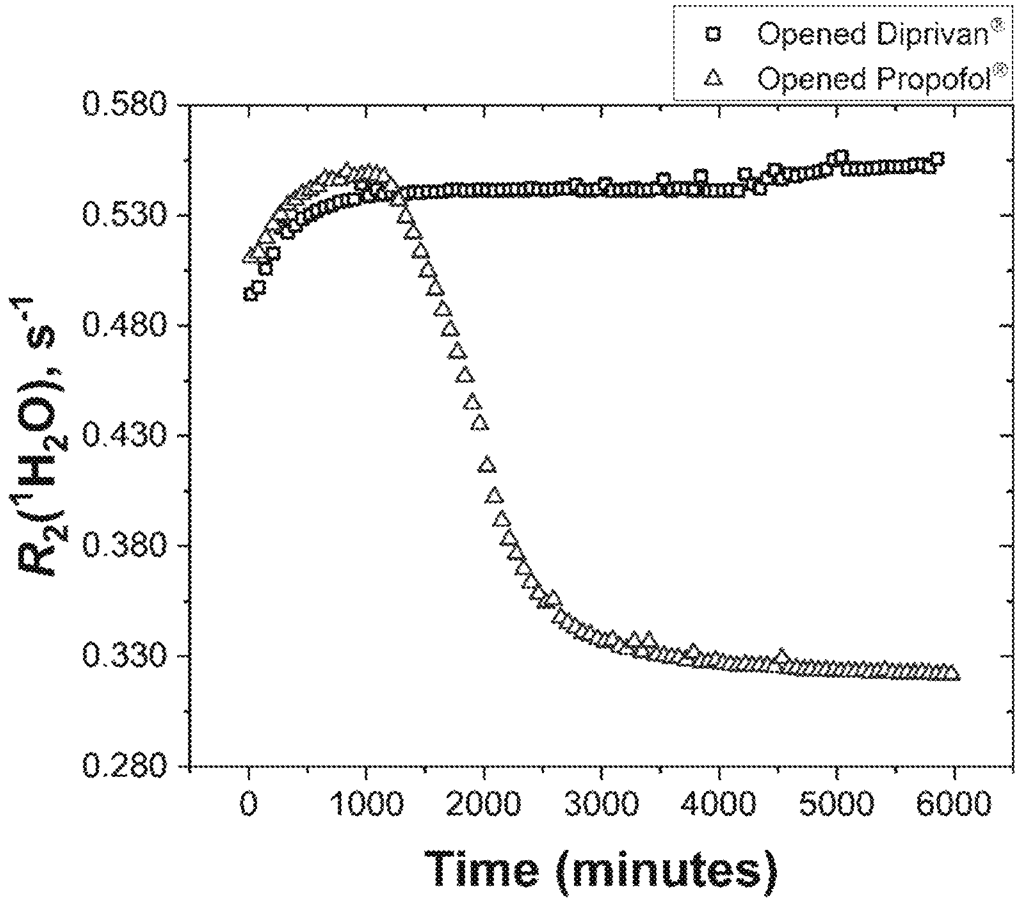
FIG. 1 illustrates the time-course of the changes of water proton relaxation rate $R_2(^1H_2O)$ due to drug product degradation of DIPRIVAN compared to PROPOFOL resulting from the exposure to air oxygen measured under static (non-flow) conditions. The temperature was 25° C. The magnetic field strength of the instrument was 0.55 T (23.8 MHz for $^1H$).

The present invention generally relates to a method of using NMR relaxation times or rates of solvent molecules, e.g., water, to determine if a drug product has undergone chemical degradation during manufacturing, transportation, or storage. If degradation is determined, the pharmaceutical product can be removed from the manufacturing or distribution chain to ensure it isn't administered to a patient.

As defined herein, a "drug product" comprises at least one active pharmaceutical ingredient (API), including biologics and small molecules (i.e., non-biologics), in an aqueous medium. The drug products can further comprise at least one excipient including, but not limited to, at least one adjuvant, at least one surfactant, at least one water-soluble organic solvent, at least one dispersant, at least one biocide, at least one buffering agent, at least one pH adjusting agent (e.g., acids and/or bases), at least one peptide, at least one antimicrobial, at least one polypeptide, at least one protein, at least one nucleic acid, at least one oil, or any combination thereof, as readily determined by the person skilled in the art.

The drug product is formulated as an emulsion, a suspension, or a solution. The drug product can be transparent or milky or opaque or has color. In one embodiment, the drug product can comprise a protein or a peptide. In another embodiment, the drug product is substantially devoid of any proteins or peptides.

"Substantially devoid" is defined herein to mean that none of the indicated substance is intentionally added to or present in the composition.

It should be appreciated that a "patient" includes any human or other mammal, reptile, bird, fish, or amphibian.

As defined herein, "chemical degradation" or "chemical decomposition" is intended to refer to changes to at least one species in the drug product during manufacturing, storage, or use as a result of chemical reactions including, but is not limited to, oxidation and hydrolysis. It should be appreciated by the person skilled in the art that the API and/or the excipient(s) in the container can undergo chemical degradation. Oxidative reactions can occur by exposure to oxygen, light, heat and certain trace metals. There are a large number of functional groups that are susceptible to hydrolysis, including esters, amides, imines, acetals, sulfates, and phosphate esters. Some species in drug products readily undergo oxidative degradation if not manufactured and packaged under the strictest of protocols, for example, in the presence of nitrogen and/or argon. In addition, some drug products are dosed using monitored dosage systems (MDS), whereby drug products are removed from the vials or containers and exposed to air. With regards to hydrolysis, some drug products have to be stored dry and combined with water prior to administration. Other drug products have to be stored at lower temperatures to minimize the possibility of hydrolysis. Chemical degradation of at least one species in a drug product affects the stability of the drug product and concomitantly, the potency of the API.

For the purposes of the present description, chemical degradation does not include physical changes such as aggregation and/or freezing, does not include the N-terminal acetylation or C-terminal amidation of peptides, and does not include diglycine dimerization.

Broadly, the present invention relates to the use of the water proton ($^1H_2O$) NMR signal to monitor the chemical degradation of APIs and/or excipients in a drug product. The rationale is that, due to the extensive interaction between the solvent (water) and the solutes (API, excipients), the $^1H_2O$ signal is sensitive to chemical changes of solutes, such as the chemical degradation of APIs and/or excipients.

The method described herein is a reliable and simple method to assess whether drug products have undergone chemical degradation during manufacturing, transportation and/or storage of same. For example, some drug products undergo oxidative degradation in the presence of oxygen, and therefore are packaged under nitrogen to eliminate this degradation path. That said, manufacturing, storage and distribution mishaps are known to occur and said mishaps, which can lead to chemical degradation, for example, oxidative degradation, would not be readily evident by visually inspecting the container or vial containing the drug product. Further, more malicious acts of intentionally damaging the drug product, leading to chemical degradation, have been known to occur at some point in the manufacturing, storage, and/or distribution chain. In addition, a container comprising multiple doses of a drug product may be exposed to oxygen each time the container is opened or accessed, leading to chemical degradation, and a concomitant lowering of the efficacy of the drug product for a given dose. Still further, some drug products are supposed to be maintained at a lower temperature and a mishap occurred in the cold chain whereby the drug product was exposed to higher temperatures than permitted and hydrolysis may have occurred.

The method described herein enables the assessment of the drug products, formulated in an aqueous medium, without the requirement of opening the vial or product container, without peeling off the label on the vial, and without requiring any reagents for sample analysis. The method is quantitative and comprises measuring the nuclear spin relaxation rate constant, $R_1$ and/or $R_2$, of solvent, e.g., water, as a quality control and quality assurance parameter. In the present disclosure, the chemical degradation of a drug product is evidenced by a quantitative variation (either an increase or a decrease) of the nuclear spin relaxation rate constant, $R_1$ and/or $R_2$, of solvent, e.g., water. The $R_1$ and/or $R_2$ constants of the substantially non-degraded drug product or control, or preferentially an acceptable range of $R_1$ and/or $R_2$ constants of said substantially non-degraded drug product or control, can be determined by the manufacturer. The $R_1$ and/or $R_2$ constants (or range of $R_1$ and/or $R_2$ constants) can be provided in the package insert, on the vial label, or both. Thereafter, the drug product is released for sale and purchase, whereby it is transported and/or stored and/or in use and may be exposed to a degrading environment or reaction. The $R_1(^1H_2O)$ and/or $R_2(^1H_2O)$ constant of water can be measured by the manufacturer, transporter, distributor or the purchaser/user to confirm that the drug product has not undergone substantial chemical degradation. If the measured $R_1(^1H_2O)$ and/or $R_2(^1H_2O)$ constant (or range of $R_1(^1H_2O)$ and/or $R_2(^1H_2O)$ constants) of the drug product is outside of the substantially non-degraded drug product or control reference range provided by the manufacturer, meaning that the contents may have undergone some chemical degradation, the specific vial should be rejected and disposed of.

It should be appreciated that it is impossible to ensure that there is absolutely no chemical degradation within a container or vial. Accordingly, as defined herein, a "substantially non-degraded drug product," or a drug product that has not undergone "substantial chemical degradation," is one where some chemical degradation may have occurred at the molecular level, but it is otherwise statistically undetectable using modem equipment. Alternatively, a drug product that has undergone "substantial chemical degradation," as determined using the method described herein, has reduced drug product potency relative to what is expected (i.e., advertised) and possibly byproducts that may be dangerous to the patient. The method described herein is capable of determining if substantial chemical degradation occurred during storage, transportation, distribution, or subsequent to opening of a container comprising the drug product. In addition, using flow-wNMR, as described herein, it is now possible to determine if substantial chemical degradation occurred during manufacturing, in real-time, contact-free in-line settings, using low cost instrumentation, simple and rapid data acquisition and analysis, and minimal technical expertise requirement.

Recent breakthrough developments in the instrumentation for nuclear magnetic resonance (NMR) spectroscopy and imaging have opened up opportunities to design novel analytical techniques for the pharmaceutical industry. Of special importance was the introduction of commercially available, relatively inexpensive benchtop and handheld NMR and magnetic resonance imaging (MRI) instruments and relaxometers (24). Benchtop NMR instruments enable highly accurate measurements of nuclear spin relaxation times $T_1$ and $T_2$. Moreover, most of these instruments have a permanent or electronically cooled magnet with the bore from 10 mm to 45 mm and even larger which provides a great flexibility in the measurements of vials of various sizes.

Water proton NMR (wNMR) monitors water, which acts as a reporter for solutes dissolved in it. As a reporter, water has two tremendous advantages. First, its concentration far surpasses that of any solute dissolved in it, by $10^3$-$10^6$-fold in most cases. This makes the $^1H_2O$ signal easily detectable by benchtop and handheld NMR instruments. Further, the solute changes can be detected through the solvent NMR signal. In addition, water is "endogenous" to all biomanufacturing processes and all drug products. This sets it apart from "exogenous" reporters such as fluorescent dyes or radiotracers. The high concentration of "endogenous" water makes it possible for wNMR to be contact-free in situ.

The essence of wNMR is a consistency check, which makes it useful for the pharmaceutical industry, where consistency is both critical and expected. For example, wNMR can be used to determine if the contents of the drug product vials have undergone chemical degradation during manufacturing, transportation and/or storage. With this knowledge, chemically degraded drug products can be identified with certainty, thus protecting patients from ineffective or harmful products. Additionally, the unnecessary waste of substantially non-degraded drug products in a batch that contains at least one vial that has undergone chemical degradation can be prevented.

As defined herein, a "vial" corresponds to a container, vessel, bottle, syringe, injection pen, or ampoule used to store the drug product, wherein the vial comprises glass, plastic, ceramic, rubber, elastomeric material, and/or anything non-magnetic metal. The vial can have a screw top, a top that is closed using a cork or plastic stopper, a crimp vial (closed with a rubber stopper and a metal cap), a flip-top or snap cap. The vial can be tubular or have a bottle-like shape with a neck. Other types and shapes of vials used to store drug products as well as caps are readily understood by the person skilled in the art. The vials can be optically transparent or not optically transparent. There is no need to peel off any label on the vial, whether the label is transparent or not.

As defined herein, a "non-destructive" measurement is defined as a measurement performed without opening the vial or otherwise accessing, harming, or altering the contents of the vial (for example by withdrawing a portion through a rubber gasket). Moreover, a non-destructive measurement means that no additives or probes or the like (e.g., magnetic particles) are added to the vial prior to the measurement of the relaxation rate of water $R_1(^1H_2O)$ and/or $R_2(^1H_2O)$ in the drug product. Non-destructive also means that there is no need to make the vials optically transparent and no need to peel off any labels on the vials.

The present inventors have surprisingly discovered that solvent NMR can be used to detect if drug products in filled and sealed vials have undergone chemical degradation. Solvent NMR can also be used detect chemical degradation of the drug product under flow conditions, a situation relevant to drug manufacturing. The manufacturer as well as transporters, distributors, commercial end users, and researchers can use solvent NMR to inspect the drug products for chemical degradation. Advantages of low field solvent NMR includes low cost instrumentation (e.g., a desktop NMR), simple and rapid data acquisition and analysis, and minimal technical expertise requirement whereby the results are readily available within <1 min. In a preferred embodiment, the method of using solvent NMR to inspect drug products for chemical degradation is non-invasive. It should be appreciated that the measurements can occur destructively as well, whereby the vial is opened, if needed. Further, the method described herein can utilize high field NMR, if needed. In addition, the methods described herein can be used with a pioneer drug product or a generic version thereof.

In practice, the manufacturer can provide the acceptable $R_2(^1H_2O)$ or $R_1(^1H_2O)$ range in $sec^{-1}$, e.g., a control or reference range, for the substantially non-degraded drug product at storage temperatures and specific magnetic field strength(s) (e.g., 0.5 T). The user will then measure the $R_2(^1H_2O)$ or $R_1(^1H_2O)$ of the drug product at the same temperature and magnetic field strength and compare the measured $R_2(^1H_2O)$ or $R_1(^1H_2O)$ value with the manufacturer-specified acceptable range of $R_2(^1H_2O)$ or $R_1(^1H_2O)$, i.e., reference, as understood by the person skilled in the art, to determine if the drug product has undergone chemical degradation.

Accordingly, in a first aspect, a method of determining if an aqueous-based drug product has experienced substantial chemical degradation is described, said method comprising: measuring the transverse relaxation rate of solvent $R_{2,m}$ in the drug product; and determining if the drug product has undergone substantial chemical degradation by comparing the measured $R_{2,m}$ to a reference transverse relaxation rate of solvent $R_{2,r}$, wherein the reference $R_{2,r}$ represents an acceptable range for substantially non-degraded drug product, wherein when the measured $R_{2,m}$ is inside the reference $R_{2,r}$ range, the drug product has not experienced substantial chemical degradation. In one embodiment, the drug product comprises biologics or small molecules. In another embodiment, the drug product is aqueous-based can further comprise at least one excipient including, but not limited to, at least one adjuvant, at least one surfactant, at least one water-soluble organic solvent, at least one dispersant, at least one biocide, at least one buffering agent, at least one pH adjusting agent (e.g., acids and/or bases), at least one peptide, at least one antimicrobial, at least one polypeptide, at least one protein, at least one nucleic acid, at least one oil, or any combination thereof. The drug product can be formulated as an emulsion, a suspension, or a solution. The drug product can be transparent or milky or opaque or has color. The transverse relaxation rate of solvent $R_2$ can be determined using solvent NMR, preferably low field solvent NMR. Preferably, the measuring of the transverse relaxation rate of solvent $R_2$ in the drug product can be done non-invasively in a vial, but it should be appreciated that the measurement can be done invasively as well, as readily understood by the person skilled in the art. The reference $R_{2,r}$ range, at a specified temperature and magnetic field strength, can be measured by the manufacturer and the result listed in the package insert and/or the vial of the drug product. Preferably $R_{2,m}$ is measured at substantially the same temperature and magnetic field strength as $R_{2,r}$. The distributor or purchaser can then use NMR, e.g., benchtop or handheld, to measure $R_{2,m}$ at the specified temperature and magnetic field strength and compare it with the reference $R_{2,r}$ range listed in the package insert or vial before distribution or usage. If the measured $R_{2,m}$ is inside the reference $R_{2,r}$ range, the drug product has not experienced substantial chemical degradation, and as such can be distributed or used. It should be appreciated that the API and/or at least one excipient in the drug product can undergo chemical degradation that can be identified by the method of the first aspect. In one embodiment, the chemical degradation comprises oxidation. In another embodiment, the chemical degradation comprises hydrolysis.

In addition to static measurements, the method of the first aspect can be used to monitor chemical degradation of drug product, in real-time, using flow conditions.

It should be appreciated that the method of the first aspect can be based on the water proton transverse relaxation time $T_2(^1H_2O)$, instead of the rate $R_2(^1H_2O)$, as readily determined by the person skilled in the art. In other words, when water is the solvent, the manufacturer provides $T_2(^1H_2O)$ reference values for the acceptable range for substantially non-degraded drug product and the measured $T_2(^1H_2O)$ of the drug product is compared to the $T_2(^1H_2O)$ reference values. The transverse relaxation time $T_2(^1H_2O)$ (=$1/R_2(^1H_2O)$) value can be extracted by fitting experimental data to Formula (1):

$$I(t)=I_0\times\exp(-t/T_2(^1H_2O)) \qquad (1)$$

where I(t) is the $^1H_2O$ signal intensity at time t, $I_0$ is the initial $^1H_2O$ signal intensity when t=0, and t is the $T_2(^1H_2O)$ delay time.

In a second aspect, a method of determining if an aqueous-based drug product has experienced substantial chemical degradation is described, said method comprising: measuring the longitudinal relaxation rate of solvent $R_{1,m}$ in the drug product; and determining if the drug product has undergone substantial chemical degradation by comparing the measured $R_{1,m}$ to a reference longitudinal relaxation rate of solvent $R_{1,r}$, wherein the reference $R_{1,r}$ represents an acceptable range for substantially non-degraded drug product, wherein when the measured $R_{1,m}$ is inside the reference $R_{1,r}$ range, the drug product has not experienced substantial chemical degradation. In one embodiment, the drug product comprises biologics or small molecules. In another embodiment, the drug product is aqueous-based can further comprise at least one excipient including, but not limited to, at least one adjuvant, at least one surfactant, at least one water-soluble organic solvent, at least one dispersant, at least one biocide, at least one buffering agent, at least one pH adjusting agent (e.g., acids and/or bases), at least one peptide, at least one antimicrobial, at least one polypeptide, at least one protein, at least one nucleic acid, at least one oil, or any combination thereof. The drug product can be formulated as an emulsion, a suspension, or a solution. The drug product can be transparent or milky or opaque or has color. The longitudinal relaxation rate of solvent $R_1$ can be determined using solvent NMR, preferably low field solvent NMR. Preferably, the measuring of the longitudinal relaxation rate of solvent $R_1$ in the drug product can be done non-invasively in a vial, but it should be appreciated that the measurement can be done invasively as well, as readily understood by the person skilled in the art. The reference $R_{1,r}$ range, at a specified temperature and magnetic field strength, can be measured by the manufacturer and the result listed in the package insert and/or the vial of the drug product. Preferably $R_{1,m}$ is measured at substantially the same temperature and magnetic field strength as $R_{1,r}$. The distributor or purchaser can then use NMR, e.g., benchtop or handheld, to measure $R_{1,m}$ at the specified temperature and magnetic field strength and compare it with the reference $R_{1,r}$ range listed in the package insert or vial before distribution or usage. If the measured $R_{1,m}$ is inside the reference $R_{1,r}$ range, the drug product has not experienced substantial chemical degradation, and as such can be distributed or used. It should be appreciated that the API and/or at least one excipient in the drug product can undergo chemical degradation that can be identified by the method of the second aspect. In one embodiment, the chemical degradation comprises oxidation. In another embodiment, the chemical degradation comprises hydrolysis.

In addition to static measurements, the method of the second aspect can be used to monitor chemical degradation of drug product in real-time, using flow conditions.

It should be appreciated that the method of the second aspect can be based on the water proton longitudinal relaxation time $T_1(^1H_2O)$, instead of the rate $R_1(^1H_2O)$, as readily determined by the person skilled in the art. In other words, when water is the solvent, the manufacturer provides $T_1(^1H_2O)$ reference values for the acceptable range for substantially non-degraded drug product and the measured $T_1(^1H_2O)$ of the vaccine or aqueous-based pharmaceutical product is compared to the $T_1(^1H_2O)$ reference values. The longitudinal relaxation time $T_1(^1H_2O)$ (=$1/R_1(^1H_2O)$) can be extracted by fitting experimental data to Formula (2) if the inversion recovery pulse sequence was used:

$$I(t)=I_0\times\left[1-2*\exp\left(-t/T_1(^1H_2O)\right)\right] \qquad (2)$$

or by fitting experimental data to Formula (3) if the saturation recovery pulse sequence was used:

$$I(t)=I_0\times\left[1-\exp\left(-t/T_1(^1H_2O)\right)\right] \qquad (3)$$

where I(t) is the $^1H_2O$ signal intensity at time t, $I_0$ is the $^1H_2O$ signal intensity when the signal is fully recovered, and t is the $T_1(^1H_2O)$ recovery time. The person skilled in the art will readily determine the situations where one of the above listed pulse sequences could be beneficially used to extract reliable values of $T_1(^1H_2O)$.

It should be noted that chemical degradation (primary mode of degradation) may be preceded, accompanied, and/or followed by physical degradation, such as aggregation, precipitation, droplet coalescence, phase separation etc. As will be appreciated by the person skilled in the art, physical degradation pathways result in transformations of the active pharmaceutical ingredient (API) and/or other ingredients of the drug product which do not alter the total concentration of the API and/or of said ingredients. Indeed, such physical degradations as aggregation, precipitation, droplet coalescence, phase separation, etc., do not change the concentration of the API and/or of the said ingredients, and affect their physical state only. On the contrary, chemical degradation such as oxidation decreases the API and/or said ingredients concentration in the drug product. This distinction has a significant effect on the water proton NMR observations of the above two degradation pathways. It has been shown that physical degradations typically manifest themselves via the increase of water proton transverse relaxation rate, $R_2(^1H_2O)$, while the decrease of the API concentration and/or of the other excipients via chemical degradation results in the drop of the observed $R_2(^1H_2O)$.

The present inventors have thus disclosed a quality control and quality assurance technology using solvent NMR to determine if drug products have experienced substantial chemical degradation and hence should be removed from the distribution stream because they may have a reduced potency and/or may be dangerous to a patient. The method described herein allows for the manufacturer and/or distributor and/or end user to monitor for chemical degradation during manufacturing transport and/or storage. This can be done without opening the vial, i.e., non-invasively, or peeling off the label. Further advantages include the applicability of the method regardless of the extent of transparency or the color of the aqueous-based drug product.

The features and advantages of the invention are more fully shown by the illustrative examples discussed below.

Example 1

The transverse relaxation rate of the water proton NMR signal, $R_2(^1H_2O)$ was applied to monitor the oxidative degradation of a pair of drugs, DIPRIVAN and PROPOFOL. DIPRIVAN is the reference listed drug (RLD) while PROPOFOL is its generic. Both products are whitish aqueous emulsions and the active API of both products is 2,6-diisopropylphenol, shown as formula I below.

(I)

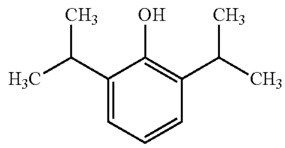

Although the two drugs have the same API, they differ in excipients. DIPRIVAN contains EDTA disodium salt as an antimicrobial while PROPOFOL contains sodium bisulfite as an antimicrobial.

The package inserts of both products state that PROPOFOL undergoes oxidative degradation in the presence of oxygen, and therefore is packaged under nitrogen to eliminate this degradation path. Hence it is expected than when a vial of DIPRIVAN or PROPOFOL is opened and its emulsion content is exposed to air, oxidative degradation will take place. Of these two, it was reported previously that the propofol emulsion with sodium bisulfite (PROPOFOL) is less stable than the propofol emulsion with EDTA disodium salt (DIPRIVAN) (M. T. Baker, et al., *Anesthesiology,* 97, 1162-67, 2002).

Vials of both products were opened so to expose the respective emulsion to air. The water proton transverse relaxation rate, $R_2(^1H_2O)$ was used to compare the non-exposed product relative to the product that underwent oxidative degradation by air. It was observed that DIPRIVAN is indeed more stable than PROPOFOL, consistent with prior reports, which used invasive techniques (e.g., color reactions (Id.; M. T. Baker, *Anesthesiology,* 100, 1235-41, 2004) and mass spectrometry (M. T. Baker, *Crit. Care Med.* 31, 787-92, 2003) to monitor oxidative degradation in these two products.

FIG. 1 illustrates the time-course of the changes of water proton relaxation rate $R_2(^1H_2O)$ due to drug product degradation of DIPRIVAN compared to PROPOFOL resulting from the exposure to air oxygen measured under static (non-flow) conditions. After vial opening, $R_2(^1H_2O)$ of both PROPOFOL and DIPRIVAN display an initial rise, which is attributed to the dissolution of oxygen into the emulsion liquid (both products are sealed under nitrogen atmosphere to prevent oxidative degradation; hence vial opening exposes both products to air). Oxygen is paramagnetic, and, as such, its dissolution in aqueous preparations elevates $R_2(^1H_2O)$. In PROPOFOL, the initial rise of $R_2(^1H_2O)$ is followed by a steady decline that levels off around 2,500 min (40 hr). In contrast, in DIPRIVAN, $R_2(^1H_2O)$ is relatively stable after the initial rise. The results suggest PROPOFOL undergoes chemical degradation while DIPRIVAN remains stable during the experimental time frame (96 hrs after exposure to air for both products). The results are consistent with prior reports that PROPOFOL is more much susceptible to air-induced chemical degradation than DIPRIVAN.

Figure 2B:
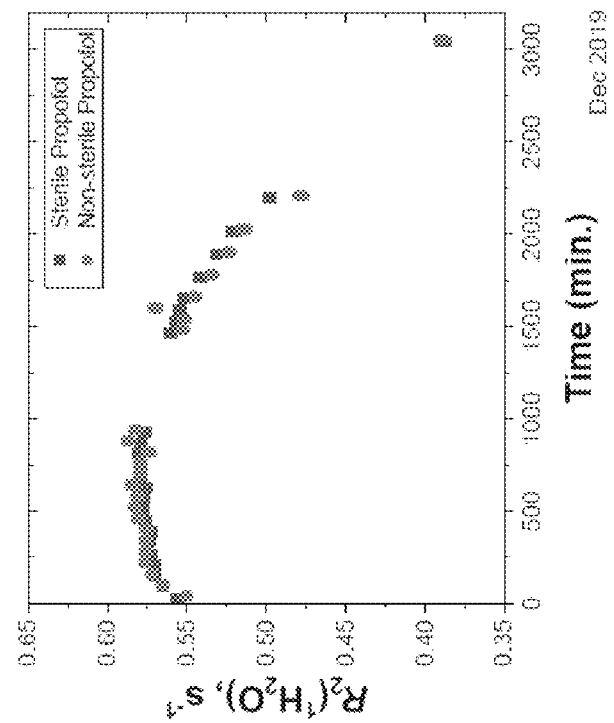
FIG. 2B illustrates the time-course of the changes of water proton relaxation rate $R_2(^1H_2O)$ due to the chemical degradation of PROPOFOL resulting from the exposure to air oxygen in real-time after vial opening in sterile versus non-sterile conditions. The temperature was 25° C. The magnetic field strength of the instrument was 0.55 T (23.8 MHz for $^1H$).
Figure 2A:
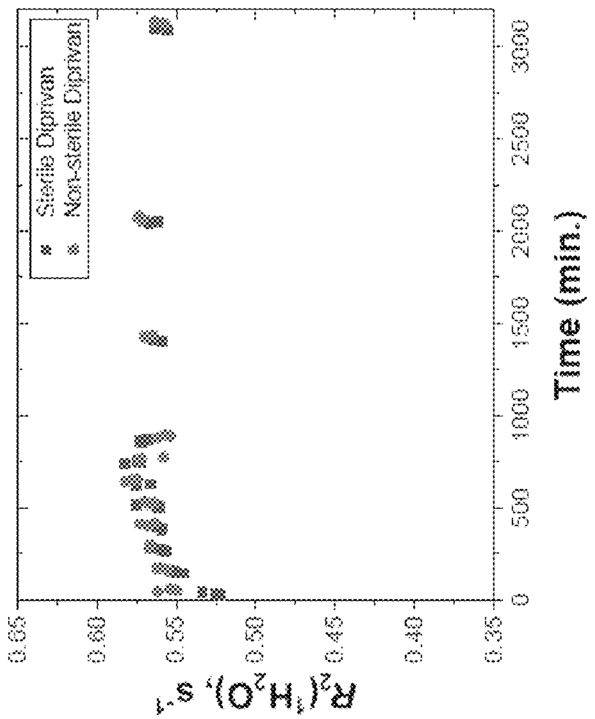
FIG. 2A illustrates the time-course of the changes of water proton relaxation rate $R_2(^1H_2O)$ due to the chemical degradation of DIPRIVAN resulting from the exposure to air oxygen in real-time after vial opening in sterile versus non-sterile conditions. The temperature was 25° C. The magnetic field strength of the instrument was 0.55 T (23.8 MHz for $^1H$).

FIGS. 2A-2B illustrates monitoring DP degradation in real-time after vial opening. In both products, the $R_2(^1H_2O)$ initially increased immediately after vial opening, consistent with replacing the nitrogen in the headspace atmosphere with oxygen. The difference between them is that the "sterile" samples were prepared under sterile conditions (in biosafety cabinet, and using sterilized vials), while the "non-sterile" samples were prepared in non-sterilized vials under non-sterile conditions, i.e., on the lab bench. Both the "sterile" and "non-sterile" samples were exposed to oxygen in the air to undergo oxidative degradation. Since the degradation in the sterile sample tracked the non-sterile sample in both FIGS. 2A and 2B, it can be concluded that the degradation was driven by oxidation and not by bacterial contamination. As can be seen, the $R_2(^1H_2O)$ of PROPOFOL experienced a steady decrease over time (FIG. 2A) while the $R_2(^1H_2O)$ of DIPRIVAN underwent much less change over the same period of time (~50 hr) (FIG. 2B).

Example 2

Using the method described herein, chemical degradation can be monitored in real-time under flow conditions. Continuous manufacturing of drugs is one of the priorities of the pharmaceutical industry but widespread implementation is hampered by a lack of noninvasive/nondestructive process analytical technology (PAT) systems capable of real-time in-line monitoring of product flow parameters, such as concentration and/or aggregate content. We explored the potential of water proton NMR under flow conditions (flow-wNMR) to use $R_2(^1H_2O)$ as a quantitative indicator of chemical degradation of PROPOFOL under flow conditions. This experiment is important because continuous synthesis/manufacturing is being developed for PROPOFOL.

Figure 4:
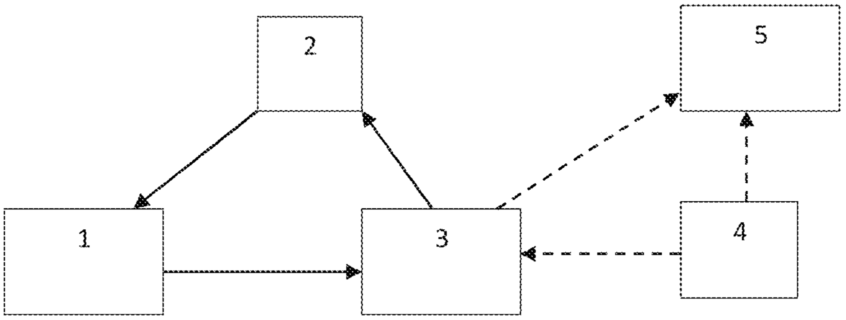
FIG. 4 is a schematic of the flow NMR measurements set up. Solid lines indicate material flow and dashed lines indicate information flow.

Towards that end, wNMR under flow conditions (flow-wNMR) was used as a contact-free in-line PAT to demonstrate the usefulness of the same for continuous manufacturing. A custom-made flow NMR instrument (see, FIG. 4) was developed to analyze the changes of $R_2(^1H_2O)$ due to changes of the solute integrity (e.g., via physical or chemical degradation) under flow. There is no bypass system and no stop-flow cell. The results demonstrate that flow-wNMR could be used as a contact-free in-line PAT to monitor drug degradation under flow conditions. FIG. 4 is an schematic of an embodiment of a flow wNMR apparatus, said apparatus comprising (1) a peristaltic pump; (2) a sample reservoir (50 mL centrifuge tube); (3) magnet with flow tube inserted; (4) magnet thermostat with spectrometer console; and (5) control and data processing PC. The person skilled in the art can readily envision the placement of an apparatus at a location to detect chemical degradation, e.g., of a continuously manufacturing drug product. Flow wNMR apparatuses can be purchased from Resonance Systems, GmbH, Kirchheim/Teck, Germany.

Figure 3:
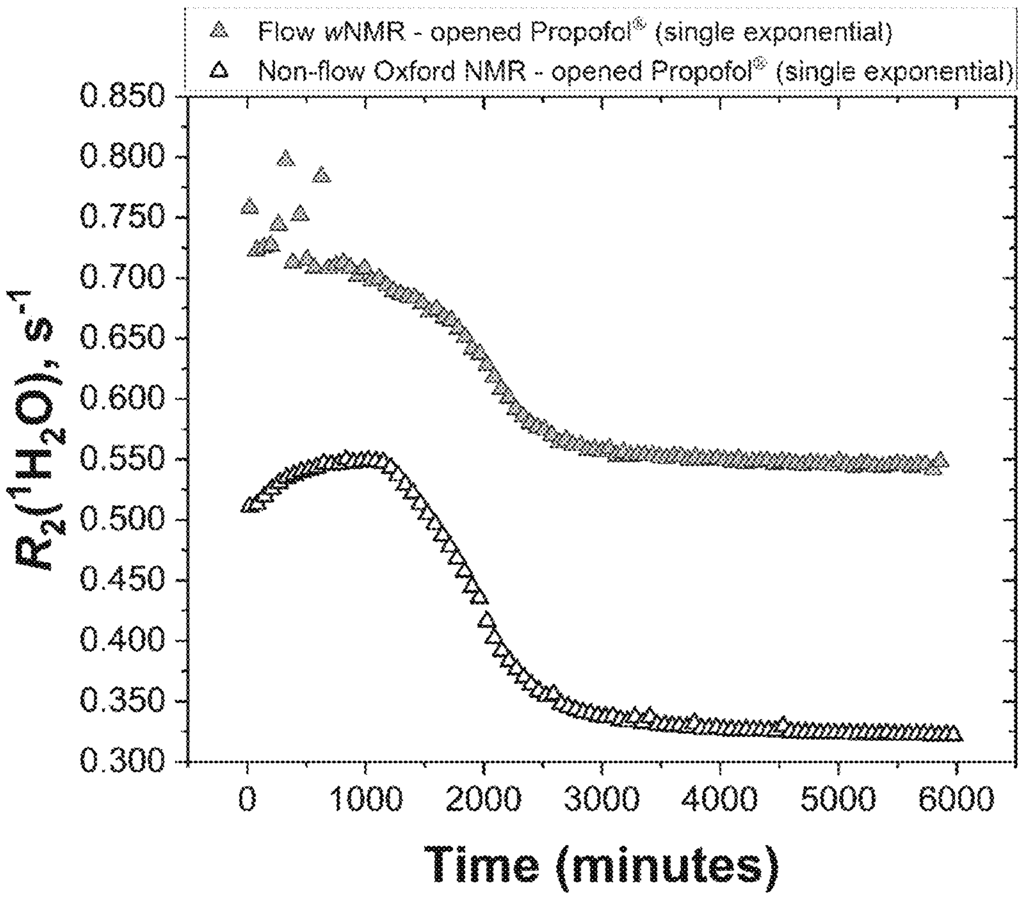
FIG. 3 illustrates the time-course of the changes of water proton relaxation rate $R_2(^1H_2O)$ due to drug product degradation of PROPOFOL under static versus flow conditions. Degradation under static conditions was at 25° C. and magnetic field strength of the NMR instrument was 0.55 T (23.8 MHz for $^1H$). Degradation under flow conditions was at 18° C. and magnetic field strength of the NMR instrument was 0.37 T (15.9 MHz for $^1H$). The flow rate was 10 mL/min.

FIG. 3 illustrates the time-course of the changes of water proton relaxation rate $R_2(^1H_2O)$ due to drug product degradation of PROPOFOL under static versus flow conditions. Degradation under static conditions was at 25° C. and magnetic field strength of the NMR instrument was 0.55 T (23.8 MHz for $^1H$). Degradation under flow conditions was at 18° C. and magnetic field strength of the NMR instrument was 0.37 T (15.9 MHz for $^1H$). The flow rate was 10 mL/min. The static experiment was performed under sterile conditions, while the flow experiment was performed under non-sterile conditions. Despite the differences in physical conditions, the reaction time courses were very similar, which is evidence that the degradation is due to oxidation, not microbe growth. These observations show that flow-wNMR could be advantageously used for monitoring drug products degradation and quality control under conditions of continuous manufacturing.

Accordingly, in yet another aspect, the instant invention relates to a method of detecting substantial chemical degradation of a drug product in real-time in-line during manufacturing, said method comprising:

flowing the drug product into a filling conduit, wherein the filling conduit directs the drug product into a vial, and wherein the filling conduit is arranged to flow through a magnet and a probe of a nuclear magnetic resonance (NMR) spectrometer prior to direction to the vial;

measuring the transverse relaxation rate of solvent $R_{2,m}$ in the drug product flowing through the filling conduit; and comparing the measured $R_{2,m}$ to a reference transverse relaxation rate of solvent $R_{2,r}$ for the drug product, wherein the reference $R_{2,r}$ represents an acceptable concentration of drug product (or a minimal amount of chemical degradation, wherein when the measured $R_{2,m}$ is inside a range of the reference $R_{2,r}$, substantial chemical degradation has occurred and filling of the vial should cease.

Although the invention has been variously disclosed herein with reference to illustrative embodiments and features, it will be appreciated that the embodiments and features described hereinabove are not intended to limit the invention, and that other variations, modifications and other embodiments will suggest themselves to those of ordinary skill in the art, based on the disclosure herein. The invention therefore is to be broadly construed, as encompassing all such variations, modifications and alternative embodiments within the spirit and scope of the claims hereafter set forth.

What is claimed is:

1. A method of determining if an aqueous-based drug product has experienced substantial oxidation at some point during manufacturing, storage, and/or distribution chain, wherein the aqueous-based drug product comprises biologics, said method comprising:

measuring a transverse relaxation rate of water, $R_{2m}$, in the aqueous-based drug product using water proton nuclear magnetic resonance (wNMR), wherein the aqueous-based drug product is contained in a filled and sealed vial and wherein the $R_{2m}$, is measured without opening the vial and without adding any additives to the vial prior to measurement of the $R_{2m}$; and determining if the aqueous-based drug product has undergone substantial oxidation by comparing the measured $R_{2m}$ to a reference transverse relaxation rate of water $R_{2r}$, wherein the reference $R_{2r}$ represents an acceptable range for substantially non-oxidized aqueous-based drug product, wherein when the measured $R_{2m}$ is inside the reference $R_{2r}$ range, the aqueous-based drug product has not experienced substantial oxidation and the vial remains in the manufacturing, storage, or distribution chain, and when the measured $R_{2m}$ is less than the reference $R_{2r}$ range, the aqueous-based drug product has experienced substantial oxidation and the vial is removed from the manufacturing, storage, or distribution chain.

2. The method of claim 1, wherein the aqueous-based drug product comprises at least one excipient selected from the group consisting of at least one adjuvant, at least one surfactant, at least one water-soluble organic solvent, at least one dispersant, at least one biocide, at least one buffering agent, at least one pH adjusting agent, at least one peptide, at least one antimicrobial, at least one polypeptide, at least one protein, at least one nucleic acid, at least one oil, and any combination thereof.

3. The method of claim 1, wherein the aqueous-based drug product is formulated as an emulsion, a suspension, or a solution.

4. The method of claim 1, wherein the vial is not required to be optically transparent.

5. The method of claim 1, wherein the $R_{2,m}$ is measured without removing any labels from the vial.

* * * * *